(12) United States Patent
Ferrigni

(10) Patent No.: US 8,485,285 B2
(45) Date of Patent: Jul. 16, 2013

(54) MOBILE PRODUCT RETAIL SYSTEM AND METHODS THEREOF

(76) Inventor: Max Ferrigni, Los Angeles, CA (US)

( * ) Notice: Subject to any disclaimer, the term of this patent is extended or adjusted under 35 U.S.C. 154(b) by 0 days.

(21) Appl. No.: 13/281,375

(22) Filed: Oct. 25, 2011

(65) Prior Publication Data
US 2012/0031686 A1 Feb. 9, 2012

Related U.S. Application Data

(60) Provisional application No. 61/466,189, filed on Mar. 22, 2011.

(51) Int. Cl.
B60H 1/32 (2006.01)
(52) U.S. Cl.
USPC ......... 180/2.1; 296/22; 296/24.35; 296/24.36
(58) Field of Classification Search
USPC .............. 180/2.1, 2.2; 62/239; 296/22, 24.35, 296/24.36
See application file for complete search history.

(56) References Cited

U.S. PATENT DOCUMENTS

| 2,982,578 | A | * | 5/1961 | Lowe | 296/22 |
| 3,191,400 | A | * | 6/1965 | Swenson | 62/239 |
| 4,120,076 | A | * | 10/1978 | Lebre | 24/68 CD |
| 4,505,126 | A | * | 3/1985 | Jones et al. | 62/239 |
| 5,853,181 | A | * | 12/1998 | Booras | 280/47.35 |
| 6,182,795 | B1 | * | 2/2001 | Boerer | 186/52 |
| 6,189,944 | B1 | * | 2/2001 | Piche | 296/22 |
| 6,378,319 | B1 | * | 4/2002 | Mani | 62/239 |
| 6,467,293 | B1 | * | 10/2002 | Goosman | 62/239 |
| 6,494,313 | B1 | * | 12/2002 | Trescott | 198/867.11 |
| 7,431,555 | B2 | * | 10/2008 | Liberman | 414/787 |
| 7,703,835 | B2 | * | 4/2010 | Weeda et al. | 296/146.1 |
| 2003/0218307 | A1 | * | 11/2003 | Anderson et al. | 280/79.2 |
| 2006/0055193 | A1 | * | 3/2006 | Colborne | 296/24.3 |
| 2008/0190917 | A1 | * | 8/2008 | Frahm | 220/1.5 |
| 2008/0255901 | A1 | * | 10/2008 | Carroll et al. | 705/7 |
| 2009/0066106 | A1 | * | 3/2009 | Liu | 296/37.13 |
| 2009/0113910 | A1 | * | 5/2009 | Shim | 62/235.1 |
| 2010/0026235 | A1 | * | 2/2010 | Harris | 320/101 |
| 2011/0313811 | A1 | * | 12/2011 | Urban et al. | 705/7.25 |

\* cited by examiner

*Primary Examiner* — John Walters
*Assistant Examiner* — Brian Swenson
(74) *Attorney, Agent, or Firm* — The Law Office of Eric W. Peterson

(57) ABSTRACT

A vehicle for transporting or vending refrigerated product having a peripheral body extending vertically from the supporting surface, the peripheral body having a driver area, retail area, and cooling area, a bulk head for dividing the retail area from the cooling area, an auxiliary power system for powering at least one electrical component, having a battery bank and a charging mechanism, the charging mechanism having a vehicle charging system, shore power charging system, and solar array charging system, the charging mechanism imparting electrical charge to the battery bank, where the electrical component is a temperature control system for maintaining the temperature of the cooling area within a desired temperature range.

19 Claims, 11 Drawing Sheets

MOBILE PRODUCT RETAIL SYSTEM AND METHODS THEREOF

CROSS-REFERENCE TO RELATED APPLICATION

This application claims the benefit of priority to U.S. Provisional Application No. 61/466,189, filed on Mar. 22, 2011, which is incorporated herein by reference in its entirety.

BACKGROUND

Food transportation vehicles have been used for many years. Food transportation vehicles provide a means of transporting food from one location to another. While food transportation vehicles are suitable for their intended purpose of delivering large quantities of food to retail locations in an efficient manner, they do not offer an ability to retail food items directly from the vehicle and must be used in conjunction with a retail store.

Some smaller food transportation vehicles do offer an ability to retail foods at their remote location. Although these food vehicles are suitable for their intended use, they do not operate in a manner which limits the amount of energy required, fossil fuel burned and resulting $CO_2$ produced to provide these meals.

SUMMARY OF THE INVENTION

The present disclosure pertains to a vehicle for transporting or vending refrigerated product having a chassis supported by wheels, a supporting surface supported by the chassis, a peripheral body extending vertically from the supporting surface, having a first sidewall, a second sidewall, a rear wall, and a top side, the peripheral body having a driver area, retail area, and cooling area, a bulk head for dividing the retail area from the cooling area and reducing the rate of heat transfer between the retail area and the cooling area, and an auxiliary power system for powering at least one electrical component, having a battery bank and a charging mechanism, the charging mechanism having a vehicle charging system, shore power charging system, and solar array charging system, the charging mechanism imparting electrical charge to the battery bank, where the electrical component is a temperature control system for maintaining the temperature of the cooling area within a desired temperature range, the temperature control system having an evaporator, condenser, compressor and thermostat.

In one aspect of the disclosure, the retail area has a retractable panel providing for a service window where the retractable panel is in the open position, the service window allowing the operator to pass product from the retail area to the exterior of the vehicle. In one aspect of the disclosure, the retail area has an order preparation counter. In one aspect of the disclosure, the retail area has a vehicle point of sale system having a computer station, a printer, a video camera, and a router. In one aspect of the disclosure, the point of sale system has a vehicle server and a point of sale terminal, wherein the vehicle server transmits data to a host server.

In one aspect of the disclosure, the cooling area has a liner for reducing the time and energy required to maintain the temperature within a desired temperature range. In one aspect of the disclosure, the cooling area has a thermal break for reducing the rate of heat transfer between the cooling area and the retail area by way of the supporting surface.

In one aspect of the disclosure, the rear wall has an insulated rear door that opens providing for a doorway providing the product to pass through the rear wall into the cooling area. In one aspect of the disclosure, the bulk head has an insulated bulk head door providing for product to pass through the bulk head and reducing the rate of heat transfer between the retail area and the cooling area.

In one aspect of the disclosure, the temperature control system has a condensate tank to collect condensate generated by the temperature control system. In one aspect of the disclosure, the evaporator engages a sidewall and is positioned above a storage assembly, the position of the evaporator allowing an operator to travel through the aisle uninhibited by the evaporator.

In one aspect of the disclosure, the solar array charging system has a solar array, the solar array engaging the exterior of the peripheral body and providing for a radiant barrier for reducing the solar radiation and resultant heat imparted on the peripheral body.

In one aspect of the disclosure, the vehicle has a storage assembly capable of transferring product between a first temperature controlled environment and a second temperature controlled environment, the storage assembly having: a storage cabinet having a first side, a second side, a front, a back, a top, and a bottom, a storage container, a base, and a caster that engages the base and provides for the storage assembly to roll. In one aspect of the disclosure, the storage assembly has an upper storage portion having a tapered back, the tapered back providing for the storage assembly to be stored substantially flush to a sidewall of the cooling area.

In one aspect of the disclosure, the vehicle has a wheel well and a restraining device wherein the storage assembly further has a cavity, the restraining device prevents the storage assembly from moving forward or backward during transit of the vehicle. In one aspect of the disclosure, the vehicle has a securing device for securing the storage assembly to a sidewall for preventing the storage assembly from moving laterally during transit of the vehicle. In one aspect of the disclosure, the vehicle has a lift mechanism for transferring a storage assembly from a first height to a second height. In one aspect of the disclosure, the vehicle has a curtain for reducing the rate of heat transfer between the retail area and the cooling area. In one aspect of the disclosure, the vehicle has a temperature monitoring system having a temperature sensor and monitoring software, the monitoring software configured to interact with the temperature sensor and alert an operator when the temperature of the cooling area falls outside of a desired temperature range.

BRIEF DESCRIPTION OF THE DRAWINGS

The accompanying drawings, which are incorporated herein and form part of the specification, illustrate various embodiments of the present invention and together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
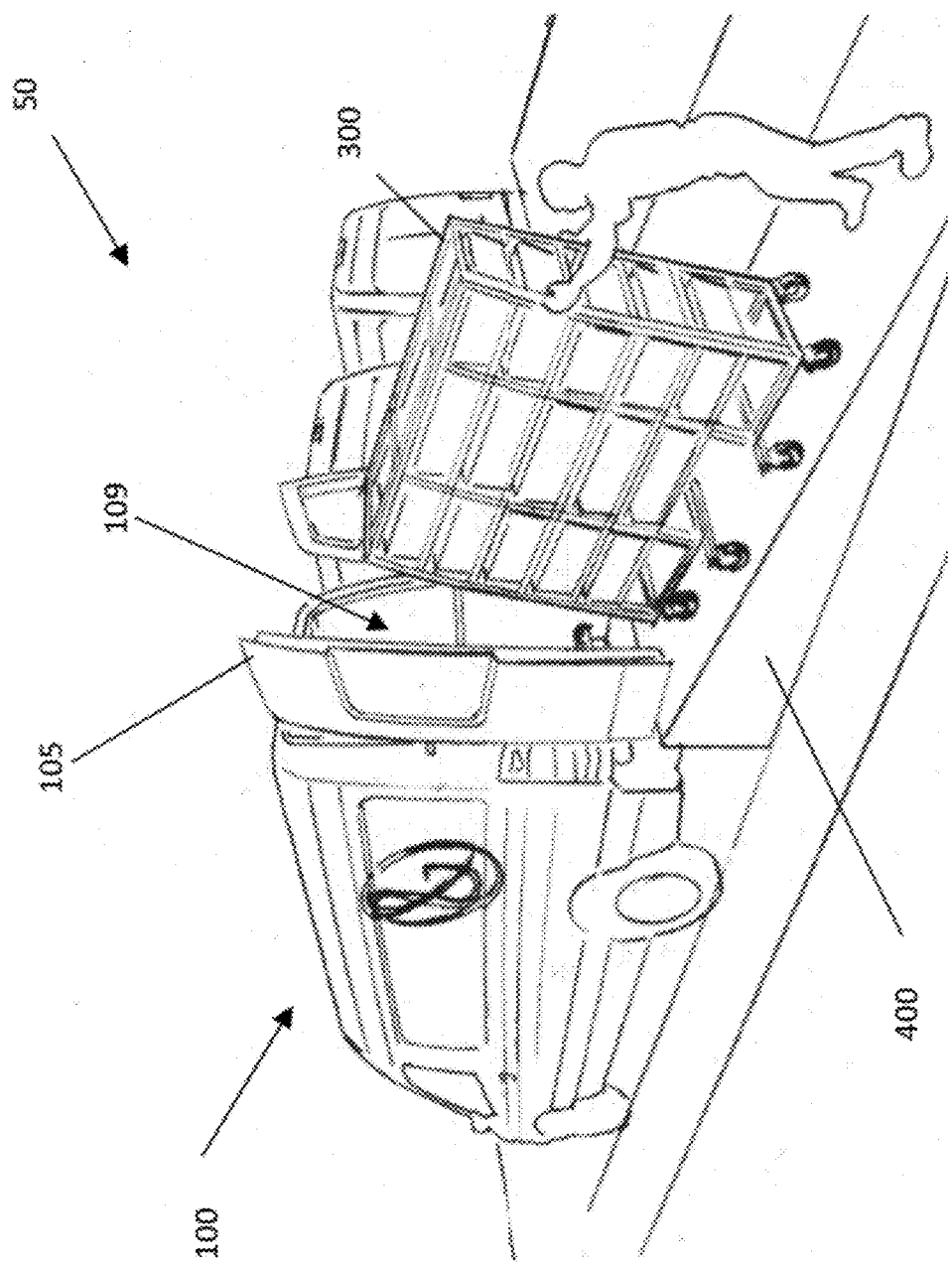
FIG. 1 is an elevated view of the mobile product retail system.
Figure 2:
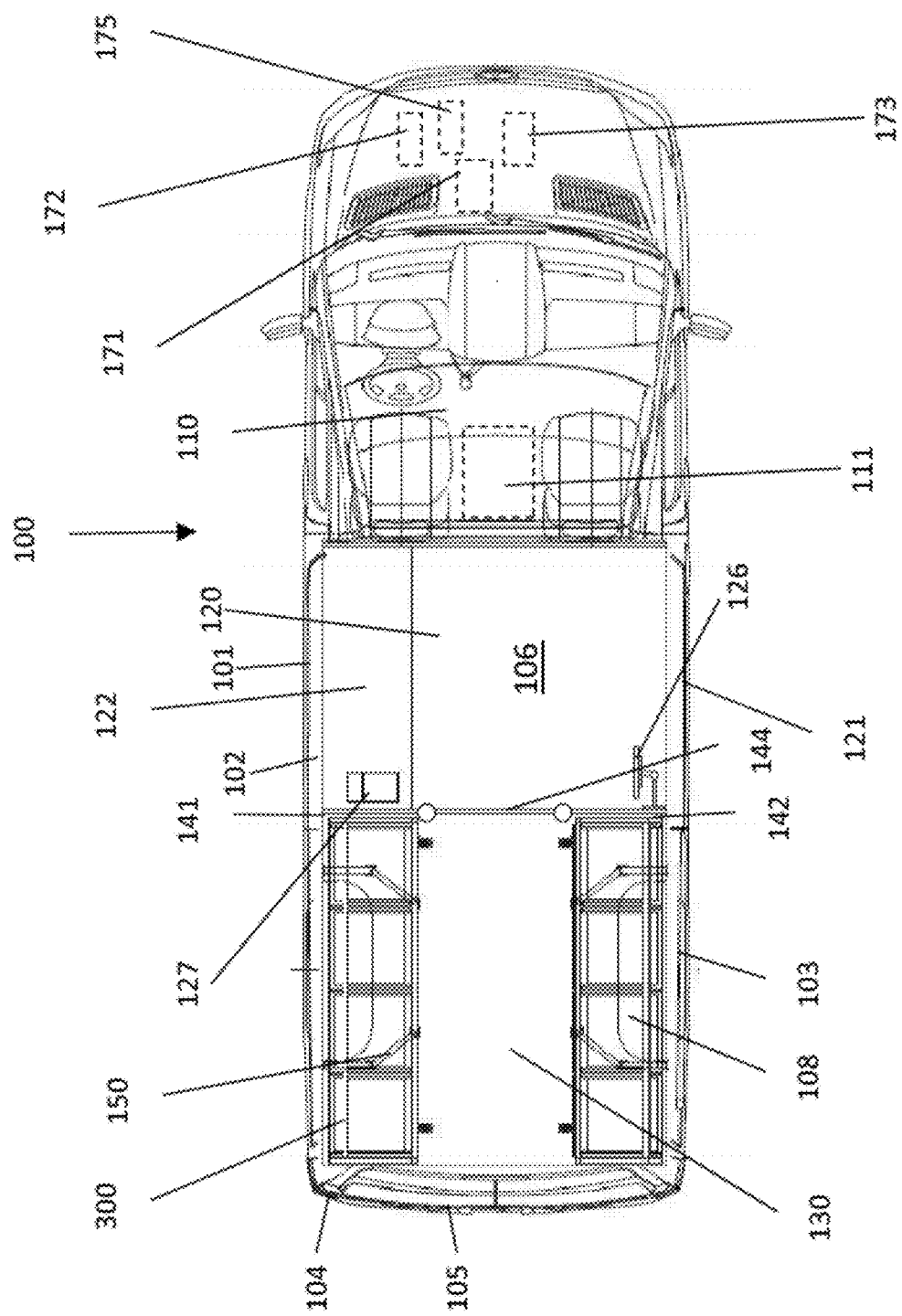
FIG. 2 is a top plan view of a vehicle according to an exemplary embodiment.
Figure 3:
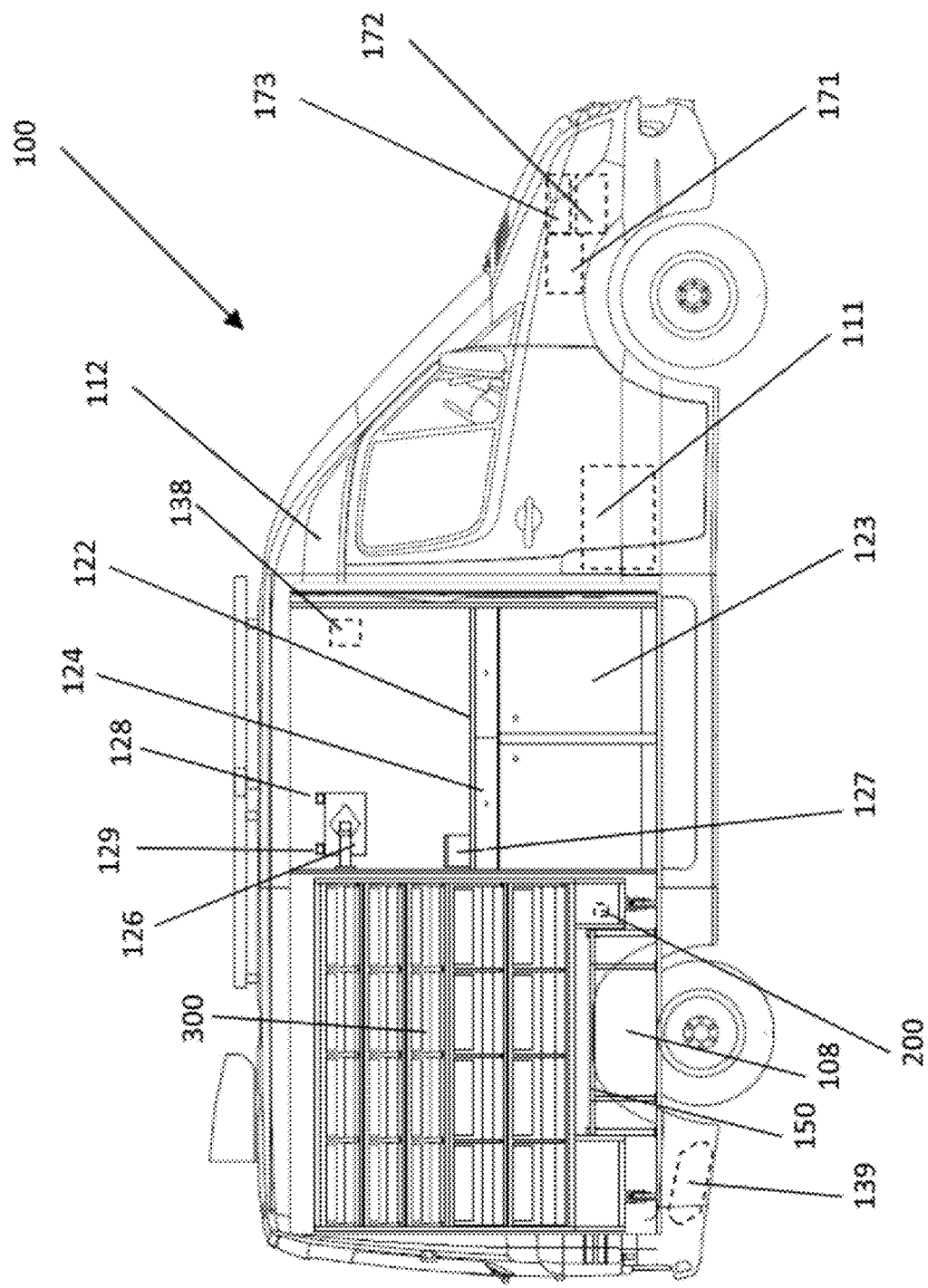
FIG. 3 is a side view of a vehicle according to an exemplary embodiment.
Figure 4:
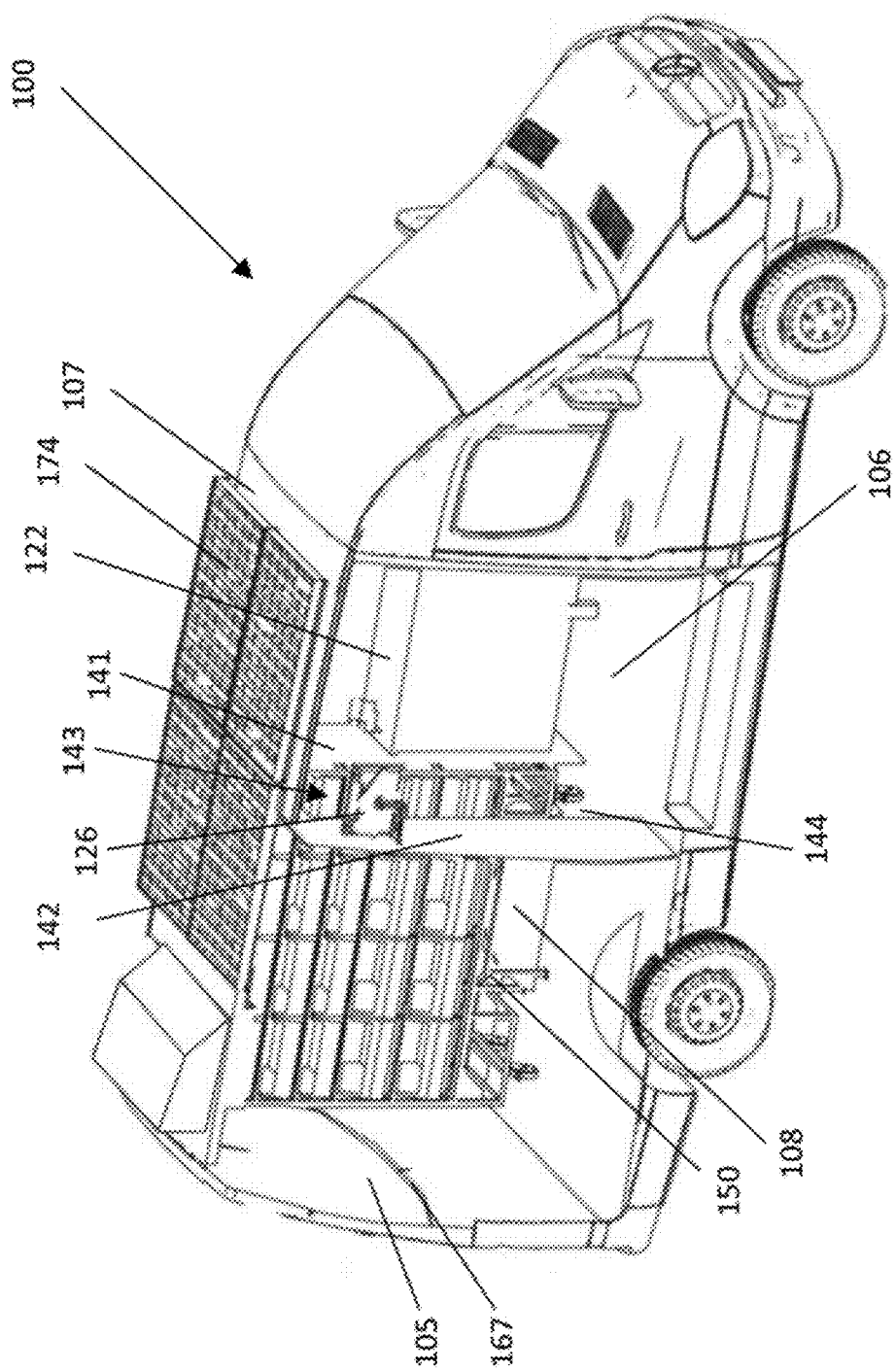
FIG. 4 is an elevated view of a vehicle according to an exemplary embodiment.
Figure 5:
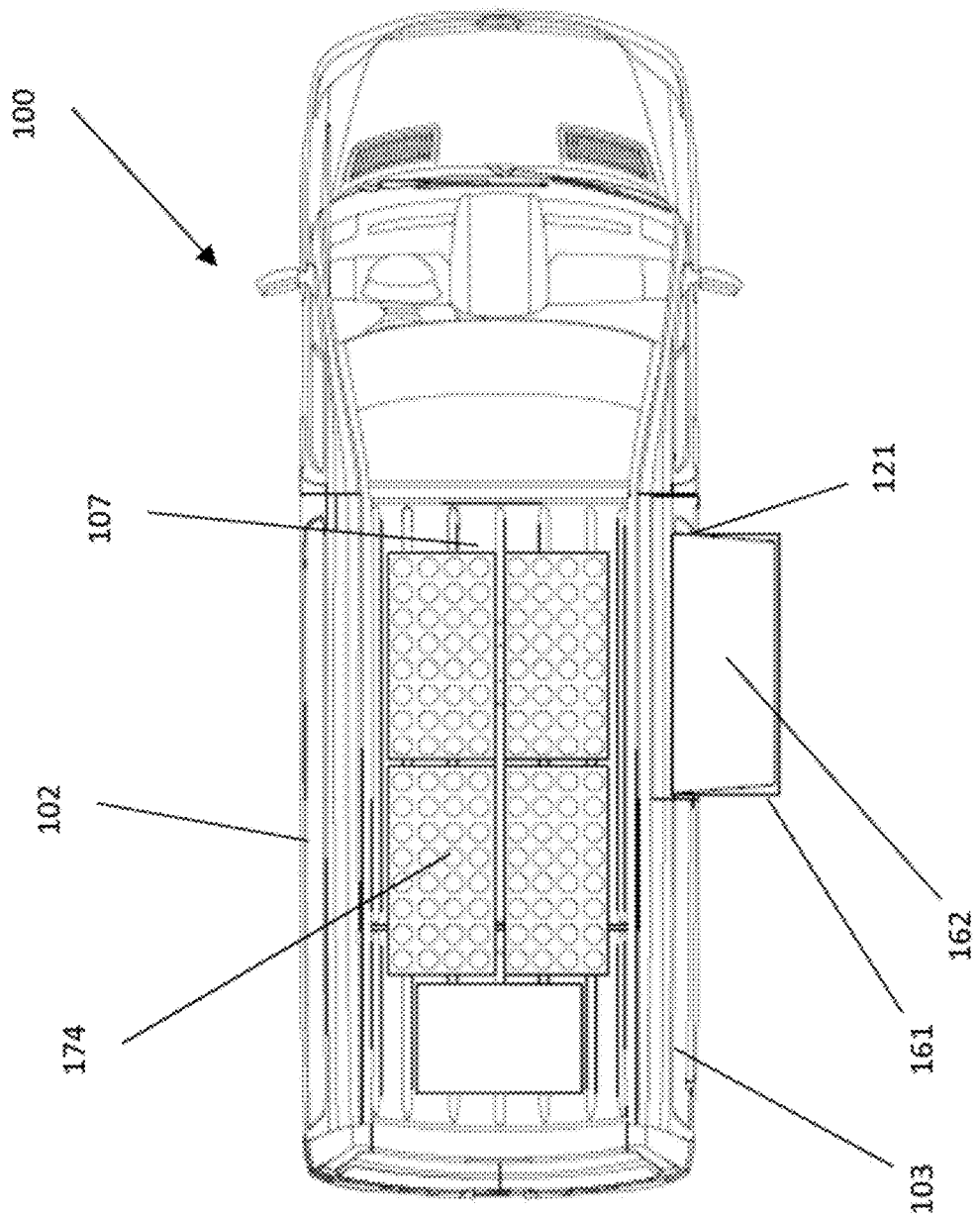
FIG. 5 is a top plan view of a vehicle according to an exemplary embodiment.

In the following detailed description, reference is made to the accompanying drawings which form a part hereof and in which is shown by way of illustration specific embodiments in which the invention may be practiced. These embodiments are described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

The present disclosure pertains to a vehicle 100 for distributing, transporting, or selling product to a customer. The vehicle 100 has all standard components of a vehicle 100, for example, without limitation, steering system, braking system, suspension system, chassis, and the like. The chassis is supported by wheels and supports a horizontal supporting surface 106 which may be of the single level variety as illustrated. The surface 106 can be made of metallic material, for example, without limitation, aluminum, that reduces damage to the surface 106 and/or allows for the surface to be easily cleaned. Peripheral body 101 extends vertically from the supporting surface 106 upwardly a distance sufficient to define an enclosed chamber of height sufficient to allow an operator of normal height to stand fully erect and move uninhibited within the chamber when supported by the supporting surface 106. The body 101 has sidewall 102, sidewall 103, rear wall 104, and top wall 107, where the rear wall 104 has at least one rear door 105. In one embodiment, sidewall 102 and sidewall 103 can be made of transparent material thereby allowing for product located inside the body 101 to be viewed from outside the body 101. The ordinary length of vehicle 100 can be between 16 and 25 feet. The forward portion of body 101 provides driver area 110 embodying the various accouterments common to driver area 110 of ordinary vehicles 100 and supplied with the necessary devices and mechanical linkages used by a driver to accomplish vehicle 100 locomotion. In one embodiment, the driver area has a bicycle storage area 111 and an overhead storage area 112.

Immediately rearward to driver area 110 provides medial retail area 120 for receiving, assembling, and transacting orders by customers. Service fixtures and appliances are carried in medial retail area 120. These fixtures and appliances provide the ordinary functions needed to prepare, receive, pack, and transact orders. Order preparation counter 122 extends inwardly from sidewall 102 of retail area 120, opposite the service window 121, with cabinets 123 and drawers 124 below the order preparation counter 122. Order preparation counter 122 supports point of sale appliances thereon for example, without limitation, computer, monitor, printer, credit card reader, or the like. In one embodiment, the order preparation counter allows for the operator to assemble orders in the retail area 120. Cabinets 123 can store supplies while drawers 124 can store cash received from customers. In one embodiment, the retail area 120 has a vehicle point of sale (POS) system allowing the operator to process orders, scan items and credit cards, print receipts, and store cash. In one embodiment, the vehicle POS system has a computer station 126, a printer 127, a video camera 128, a router 129, where the video camera 128 and router 129 allow for video of sales transactions to be created and wirelessly transmitted to an offsite hosting location.

In one embodiment, the vehicle POS system has a vehicle server and a POS terminal, where the vehicle server transmits sales and inventory data to a host server located at an offsite location. In one embodiment, the host server receives and stores sales and inventory data transmitted from at least one other POS system. The host server transmits real time sales and inventory data to the vehicle POS terminal and a second POS system, where vehicle customers and customers from a second POS system view the same assortment of items and quantity inventory when ordering in essentially real time.

In one embodiment, the retail area 120 has a retractable panel 162 that can fold out upon servicing a customer. The retractable panel 162 can be a portion or piece of the peripheral body, for example, without limitation, a portion of sidewall 102 or sidewall 103. In one embodiment, the retractable panel 162 is made of the same material and layers as those of the peripheral body 101. In the open position, the retractable panel 162 provides for service window 121 allowing the operator to pass product from the retail area 120 to the exterior of the vehicle 101. In the closed position, the retractable panel 162 engages sidewall 102 where the surface of the retractable panel is flush with the surface of the sidewall 102.

In one embodiment, the retail area 120 has a retractable table 161 that can fold out upon servicing a customer. The retractable table 161 can engage sidewall 102 or sidewall 103.

In one embodiment, the retail area 120 has a video camera 128 for recording video within the retail area 120. The video camera 128 can be wireless allowing for video to be wirelessly transmitted to a router 129.

Immediately rearward of the medial retail area 120 is cooling area 130 for storing product in a temperature controlled environment. While the cooling area 130 can be a variety of sizes, the cooling area 130 can be 5.5' wide by 6' long. In one embodiment, the sections of sidewall 102, sidewall 103, rear wall 104, and top wall 107 that define the vehicle cooling area have insulation incorporated into said sections to reduce the time and energy required to maintain the temperature between the desired temperature range, thereby providing for outstanding thermal efficiency. While the insulation can maintain any temperature range, the insulation preferably accommodates temperatures ranging from as low as 34° F. to as high as 41° F. This temperature efficiency range is aided by the fact that the insulation has an R-value, a measure of resistance to heat flow, of at least R-6. The R-value is preferably R-30, a high rating in terms of resistance to heat flow.

Figure 11:
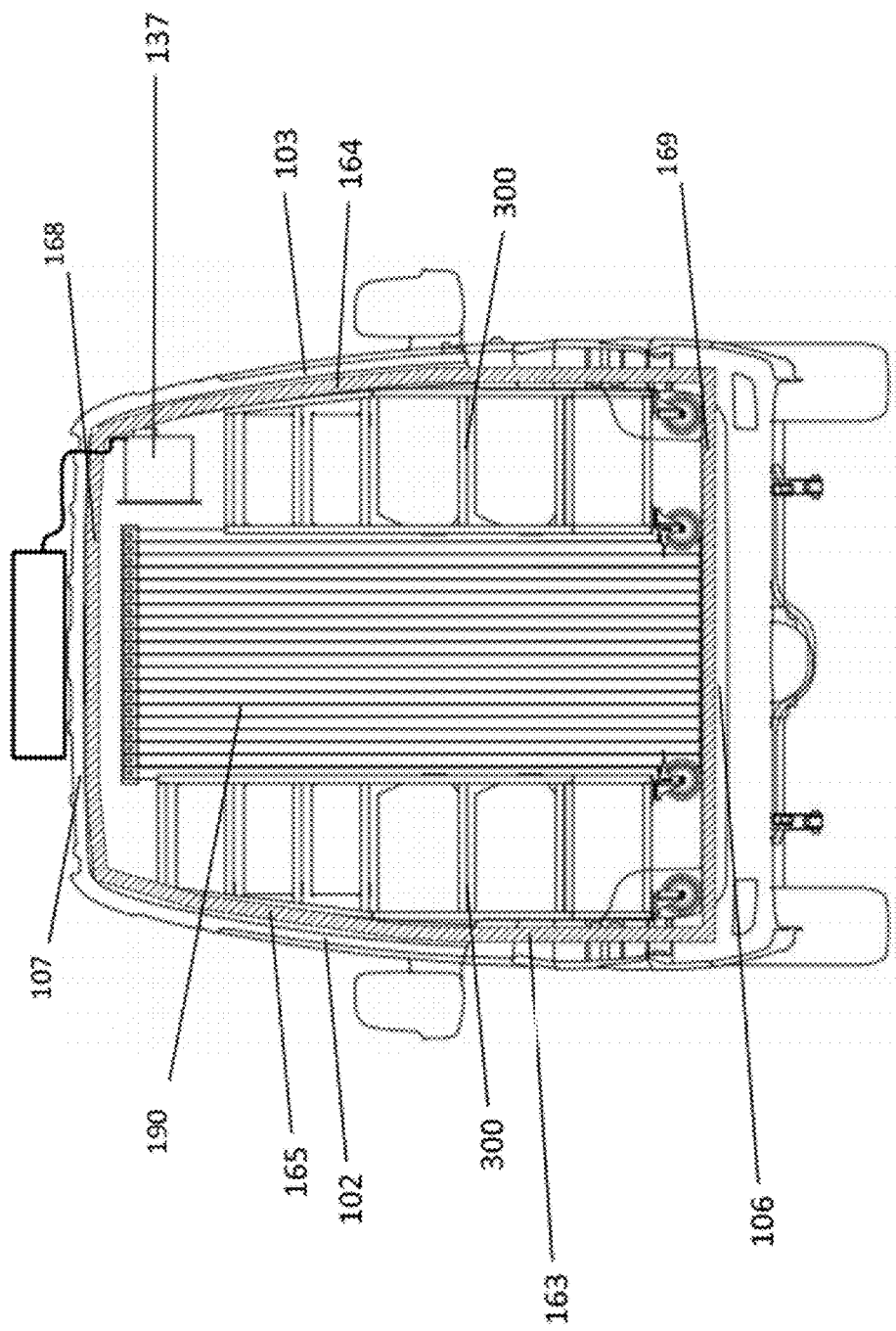
FIG. 11 is a rear view of a vehicle according to an exemplary embodiment.

In one embodiment, cooling area 130 has a liner 163 that defines the cooling area 130 for reducing the time and energy required to maintain the temperature within a desired temperature range. The liner 163 has insulation incorporated into the liner 163 for maintaining a desired temperature. The liner 163 can engage the interior surface of the body 101, for example, without limitation, the sidewall 102, sidewall 103, rear wall 104, and top wall 107, and surface 106. As shown in FIG. 11, the liner 163 can have a sidewall liner 164, a sidewall liner 165, a rear wall liner 167, a top wall liner 168, a surface liner 169, where the sidewall liner 164 engages the rear wall liner 167, bulk head liner 166, top wall liner 168, and surface liner 169, the sidewall liner 164 engages the rear wall liner 167, bulk head liner 166, top wall liner 168, and surface liner 169, the bulk head liner 166 engages the sidewall liner 164, sidewall liner 165, top wall liner 168, and surface liner 169, and the rear wall line 167 engages the sidewall liner 164, sidewall liner 165, top wall liner 168, and surface liner 169, thereby reducing the rate of heat transfer between the exterior of the vehicle 100 and the cooling area 130.

Figure 9:
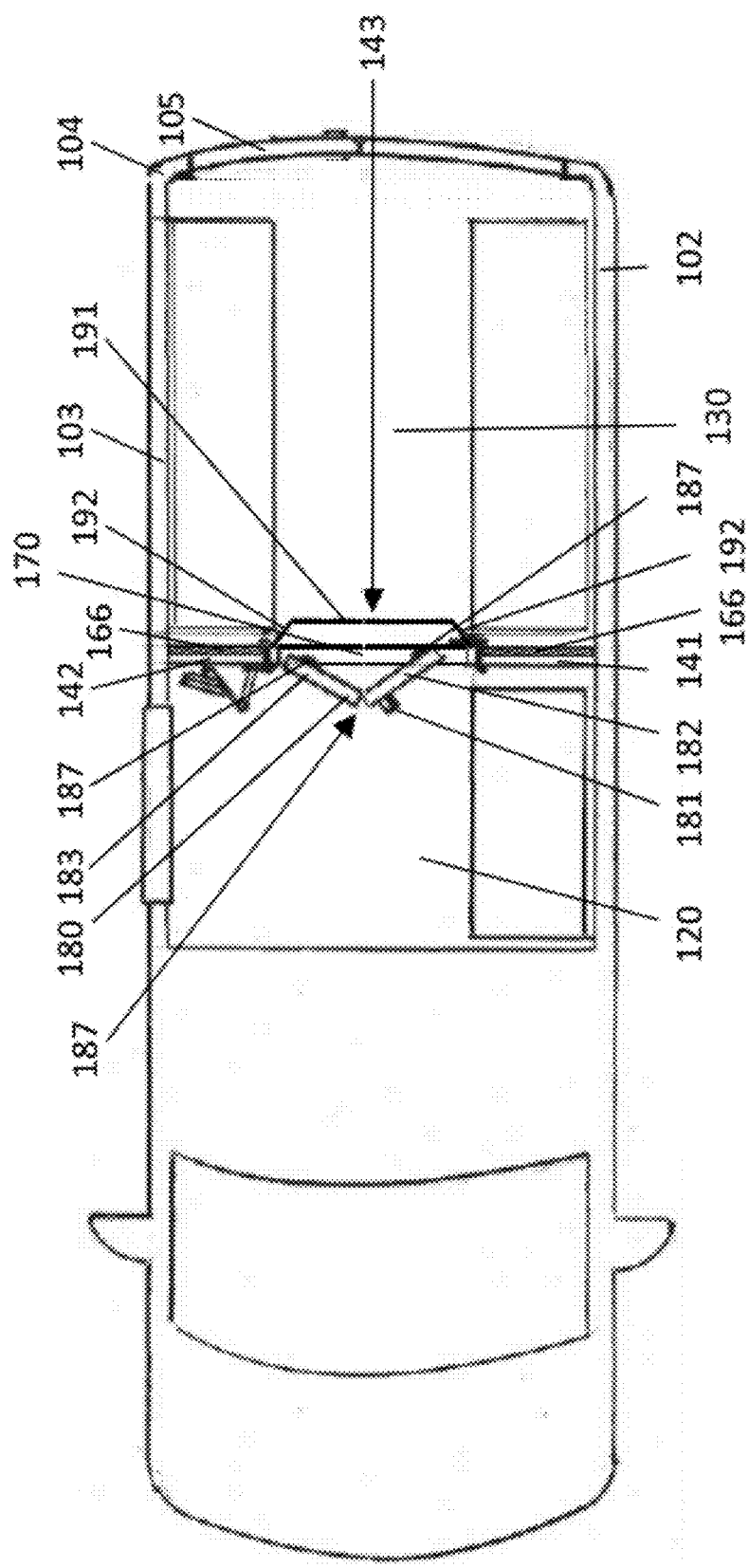
FIG. 9 is a top plan view of a vehicle according to an exemplary embodiment.

In one embodiment, the cooling area 130 has a thermal break 170 for reducing the rate heat transfer between the cooling area 130 and the medial retail area 120 by way of the supporting surface 106. As shown in FIG. 9, the thermal break 170 can be incorporated into supporting surface 106 and positioned in the vertical plane of the bulk head. The thermal break 170 has a depth sufficient to reduce the rate of heat transfer through the surface 106 between the cooling area 130 and the medial retail area 120. The thermal break 170 can be made of any material that reduces the rate of heat transfer.

In one embodiment, as shown in FIG. 9, rear wall 104 has at least one rear door 105 that opens providing for a doorway 109 for allowing product to pass through the rear wall 104 into the cooling area 130. In the preferred embodiment, the rear wall 104 has two rear doors 105. In one embodiment, the rear doors 105 are insulated. In one embodiment, the rear doors 105 have weather stripping for reducing the rate of heat transfer between the exterior of the vehicle 100 and the cooling area 130. The weather stripping is positioned so that where the rear doors 105 are in the closed position heat transfer between the rear doors 105 and the rear wall 104, and between a first rear door 105 and a second rear door 105, is reduced or eliminated. In one embodiment, the weather stripping engages the perimeter of the rear doors 105 whereby the weather stripping touches the exterior of the rear wall 104 thereby creating a seal between the rear doors 105 and the rear wall 104, and a seal between a first rear door 105 and a second rear door 105.

In one embodiment, the cooling area 130 has a temperature control system. The temperature control system maintains the temperature of cooling area 130 within a desired temperature range. While all temperature ranges are contemplated, the desired temperature range of the cooling area 130 is preferably between 34° F. and 41° F. The temperature control system cools the cooling area 130 to a desired temperature. While the temperature control system can be any mechanism for cooling the cooling area 130, the temperature control system preferably has a refrigeration unit, having standard refrigeration components, for example, without limitation, a condenser, a compressor, an evaporator 137, refrigerant, or the like, a thermostat 138, and a condensate tank 139. The temperature control system may utilize all suitable types of condensers, compressors, evaporators, and refrigerant. In the preferred embodiment, the evaporator 137 engages side wall 103 and positioned above storage assembly 300. As shown in FIG. 11, the evaporator 137 can be positioned on side wall 103, thereby not extending into the aisle between the storage assemblies 300 and allowing an operator to walk through the aisle uninhibited by the evaporator 137. The thermostat 138 obtains temperature data from the vehicle cooling area and controls the operation of the refrigeration unit. The condensate tank 139 is positioned under supporting surface 106 for collecting and/or disposing of condensate generated by the temperature control system.

In one embodiment, a bulk head separates the cooling area 130 from the retail area 120. The bulk head reduces the volume of the cooling area, thereby reducing the amount of energy required to maintain a desired cold temperature of the cooling area 130 and avoids cooling an area which is not required to be cold. The bulk head provides temperature control by reducing the rate of heat transfer between the retail area 120 and the cooling area 130. The bulk head can have insulation incorporated therein to reduce heat transfer through the bulk head. The bulk head has a first bulk head member 141, a second bulk head member 142, and a doorway 143. The doorway 143 is of sufficient dimensions to allow a human to travel between the cooling area 130 and the retail area 120. In one embodiment, the doorway 143 is shown as 30 inches wide and 74 inches tall.

Figure 10:
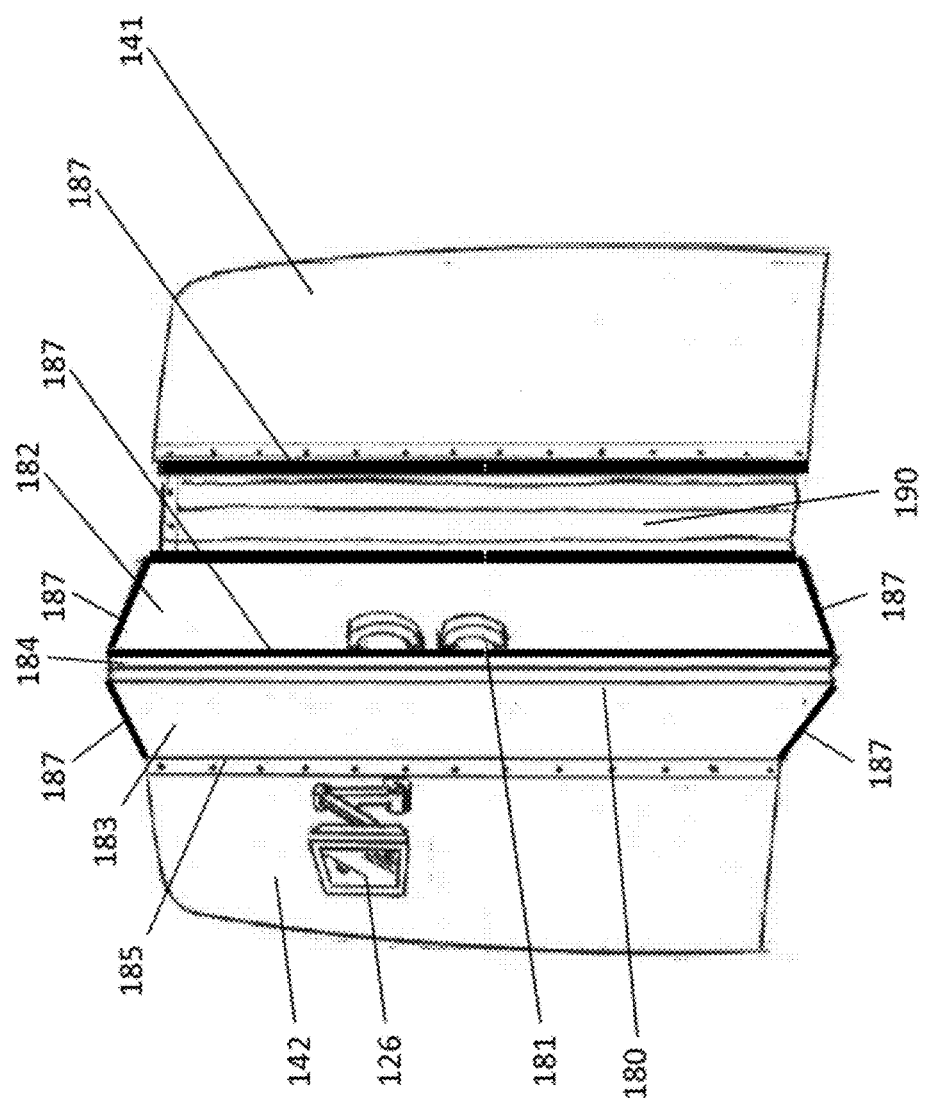
FIG. 10 is an elevated view of a bulk head according to an exemplary embodiment.

In one embodiment, as shown in FIGS. 9 and 10, the bulk head has at least one bulk head door 180 for allowing product to pass through the bulk head and reducing heat transfer between the retail area 120 and the cooling area 130. In one embodiment, the bulk head door 180 allows an operator to travel between the retail area 120 and the cooling area 130. This allows the operator to retrieve product from the cooling area 130 and limit exposure to the cold temperatures in the cooling area 130 by remaining in the retail area 130. In one embodiment, the bulk head door 180 is positioned in the doorway 143 between the first bulk head member 141 and the second bulk head member 142. In one embodiment, the bulk head door 180 has a handle 181 for opening and closing the bulk head door 180. In the preferred embodiment, the bulk head door 180 has a first door section 182 and a second door section 183 where the first door section 182 engages the second door section 183, the second door section 183 engages the second bulk head member 142, and first door section 182 engages the first bulk head member 141. In one embodiment, the first door section 182 engages the second door section 183 by way of a section hinge 184. In one embodiment, the first door section 182 engages the first bulk head member 141 by way of a door hinge 185. In one embodiment, the first door section 182 engages the second bulk head member 142 by way of a door hinge 185.

In one embodiment, the bulk head door 180 is insulated. In one embodiment, the bulk head door 180 has a gasket 187 for sealing a space between the bulk head door 180 and the bulk head, thereby reducing heat transfer between the retail area 120 and the cooling area 130 where the bulk head door 180 is in the closed position. In one embodiment, the gasket 187 seals a space between the bulk head door 180 and the first bulk head member 141, and bulk head door 180 and the second bulk member. The gasket 187 can be made of elastic material.

In one embodiment, the gasket 187 is provided around the periphery of the door. In one embodiment, the gasket 187 is provided along a side of the first bulk head member 141, a side of the second bulk head member 142, the top edge of the bulk head door 180, and the bottom edge of the bulk head door 180. In one embodiment, where the bulk head door 180 has a first door section 182 and a second door section 183 the gasket 187 is positioned on a side of the first door section 182 and/or the second door section 183, thereby reducing the rate of heat transfer between the first door section 182 and the second door section 183 where the bulk head door 180 is in the closed position.

In one embodiment, as shown in FIG. 9, the vehicle 100 has a curtain 190 for reducing the rate of heat transfer between the retail area 120 and the cooling area 130 where the curtain 190 is in the closed position. In one embodiment, the curtain 190 is positioned immediately rearward of the bulk head door 180. In one embodiment, the curtain 190 reduces the rate of heat transfer between the retail area 120 and the cooling area 130 where the bulk head door 180 is in the open position. The curtain 190 can move between a closed and open position. In one embodiment, the curtain 190 is a strip door or a plurality of vertically hanging plastic strips arranged side-by-side, or in an overlapping arrangement. In one embodiment, as shown in FIG. 9, the curtain has two side sections 192 flanking center section 191 at an angle toward the bulk head, where in the closed position one section 191 touches the first bulk head member 141 and the center section 191, and another section 191 touches the second bulk head member 142 and the center section 191. The curtain 190 is preferably made of thick insulating plastic that prevents heat from entering the cooling area 130 through the doorway 143 where the curtain 190 is in the closed position.

In one embodiment, the vehicle 100 has an auxiliary power system for providing power to the electrical components (e.g. the electrical components of the cooling area 130 and the retail area 120). The electrical components powered by the auxiliary power system can be, for example, without limitation, the vehicle point of sale system, the temperature control system, the temperature monitoring system, or the like.

In one embodiment, the auxiliary power system has a battery bank 171 and a charging mechanism. In one embodiment, the battery bank 171 has at least one auxiliary battery. The battery bank 171 can be a NiMH, lithium ion, lead acid, nickel metal hydride, the like, or any combination thereof. The charging mechanism can be any means for providing electrical charge to the battery bank 171, for example, without limitation, vehicle charging system, shore power charging system, solar array charging system, the like, or any combination thereof. The battery bank 171 can receive electrical charge from the charging mechanism and store the electrical charge on auxiliary batteries in the battery bank 171.

In one embodiment, the vehicle charging system can impart electrical charge to the battery bank 171. In one embodiment, the vehicle charging system can have vehicle charging components (e.g. alternator, converter, or the like) and a relay 175. When the engine of vehicle 100 is engaged, the relay 175 allows excess electrical charge generated by the vehicle charging components to be imparted to the battery bank.

In one embodiment, the shore power charging system can impart electrical charge to the battery bank 171. The shore power charging system can have a high ampere converter charger 172 which when connected to an alternating current (e.g. 120 volt), such as shore power or a power source external to the vehicle, allows the high ampere converter charger 172 to convert the alternating current to a suitable flow of low voltage direct current (e.g. 12 volts) thereby imparting electrical charge to the battery bank 171.

In one embodiment, the solar array charging system can impart electrical charge to the battery bank 171. In one embodiment, the solar array charging system has a solar array 174 for imparting electrical charge to the battery bank 171. The solar array 174 can be any shape or form, and can be any combination of solar panels. In one embodiment, the solar array charging system has a maximum power point tracker controller 173 that optimizes the voltage between the solar array 174 and the battery bank 171 by converting a higher voltage output from solar array 171 to a lower voltage required to charge the battery bank 171. In the presence of sunlight, the maximum power point tracker controller 173 thereby optimizes the amount of electrical charge imparted by the solar array 174 to the battery bank 171.

In one embodiment, the solar array 174 is mounted on the exterior surface of the peripheral body 101 of the vehicle 100. The location of the solar array 174 on the exterior surface of the peripheral body 101 acts as a radiant barrier between the sun and the peripheral body 101 thereby reducing the solar radiation imparted on the peripheral body 101 and reducing the resulting heat conducted from peripheral body 101 into cooling area 130. The reduction in heat imparted from the sun into peripheral body 101 and the resultant reduction in heat conducted from peripheral body 101 into cooling area 130 lowers the amount of energy required to maintain the temperature in cooling area 130.

In one embodiment, the charging mechanism imparts electrical charge to the battery bank 171 by any combination of the vehicle charging system, shore power charging system, solar array charging system, or the like. In one embodiment, the system utilized to impart electrical charge to the battery bank 171 is dependent on the activity or operation of the vehicle 100. In this embodiment, the system imparting the greatest electrical charge imparts the majority of electrical charge to the battery bank 171. For example, without limitation, where the engine of the vehicle 100 is operating and sunlight is present, electrical charge is imparted to the battery bank 171 primarily by the vehicle charging system and not the solar array charging system. In another example, without limitation, where the vehicle is connected to shore power and sunlight is present, electrical charge is imparted to the battery bank 171 primarily by the shore power charging system and not the solar array charging system. In another example, without limitation, where the engine of the vehicle 100 is not operating, the vehicle 100 is not connected to shore power, and sunlight is present, electrical charge is imparted to the battery bank 171 by the solar array 174 used in conjunction with the maximum power point tracker controller 173. By allowing the shore power charging system to impart electrical charge to the battery bank 171, the auxiliary power system can operate the necessary electronics with a lower fossil fuel requirement of vehicle 100 than if the auxiliary power system was powered solely by the vehicle charging system of vehicle 100. By allowing the solar array charging system to impart electrical charge to the battery bank 171, the auxiliary power system can operate the necessary electronics with a lower fossil fuel requirement of vehicle 100 than if the auxiliary power system was powered solely by the shore power charging system of vehicle 100.

In one embodiment, where the charging mechanism can impart electrical charge to the battery bank 171 by a combination of the solar array charging system and another source of electrical charge, for example, without limitation, the vehicle charging system, shore power charging system, or the like, the auxiliary power system has a voltage alarm which indicates if the electrical charge imparted by a specific source is sufficient to maintain a required voltage within the battery bank 171. In one embodiment, the voltage alarm is incorporated within the thermostat 138. If the electrical charge imparted by a specific source, for example, without limitation, the solar array charging system, is less than the electrical charge required by the electronic components, the voltage of the battery bank 171 will decrease. If the voltage of the battery bank 171 decreases below a specified parameter on the voltage alarm, the voltage alarm notifies the operator that the voltage of the battery bank 171 has decreased below the specified parameter. The operator can employ an alternative source of electrical charge, for example, without limitation, plugging the vehicle into shore power to initiate the shore power charging system, starting the engine of the vehicle to initiate the vehicle charging system, or the like. This alternative source of power can provide greater electrical charge to the battery bank 171 than is required by the electrical components, thereby increasing the voltage of the battery bank 171. Where the voltage of the battery bank 171 has increased beyond the specified parameter, the voltage alarm is reset.

In one embodiment, the vehicle 100 has a temperature monitoring system for monitoring the temperature inside the cooling area 130. The temperature monitoring system has at least one temperature sensor 200 and monitoring software. The temperature sensors 200 are positioned at any suitable location allowing the sensor to obtain temperature data inside the cooling area 130. The monitoring software is configured to interact with the temperature sensor 200 and alert an operator when the temperature of the cooling area 130 falls outside of a desired temperature range.

In one embodiment, vehicle 100 has a storage assembly 300 for transporting and storing product between a first temperature controlled environment and a second temperature controlled environment. The storage assembly 300 extends and travels along a longitudinal axis. The storage assembly 300 has a storage cabinet 310, a plurality of storage containers 320, a base 330, and a plurality of casters 340.

Figure 6:
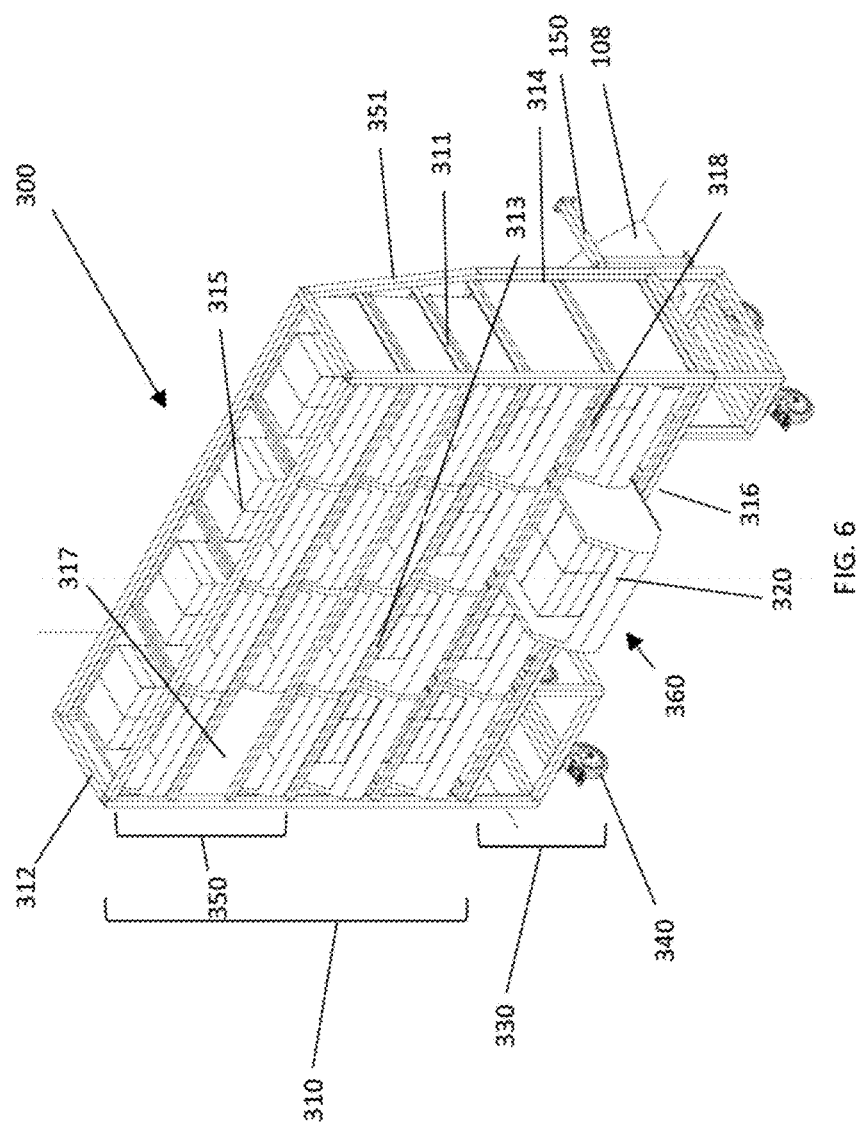
FIG. 6 is an elevated view of a storage assembly according to an exemplary embodiment.
Figure 7:
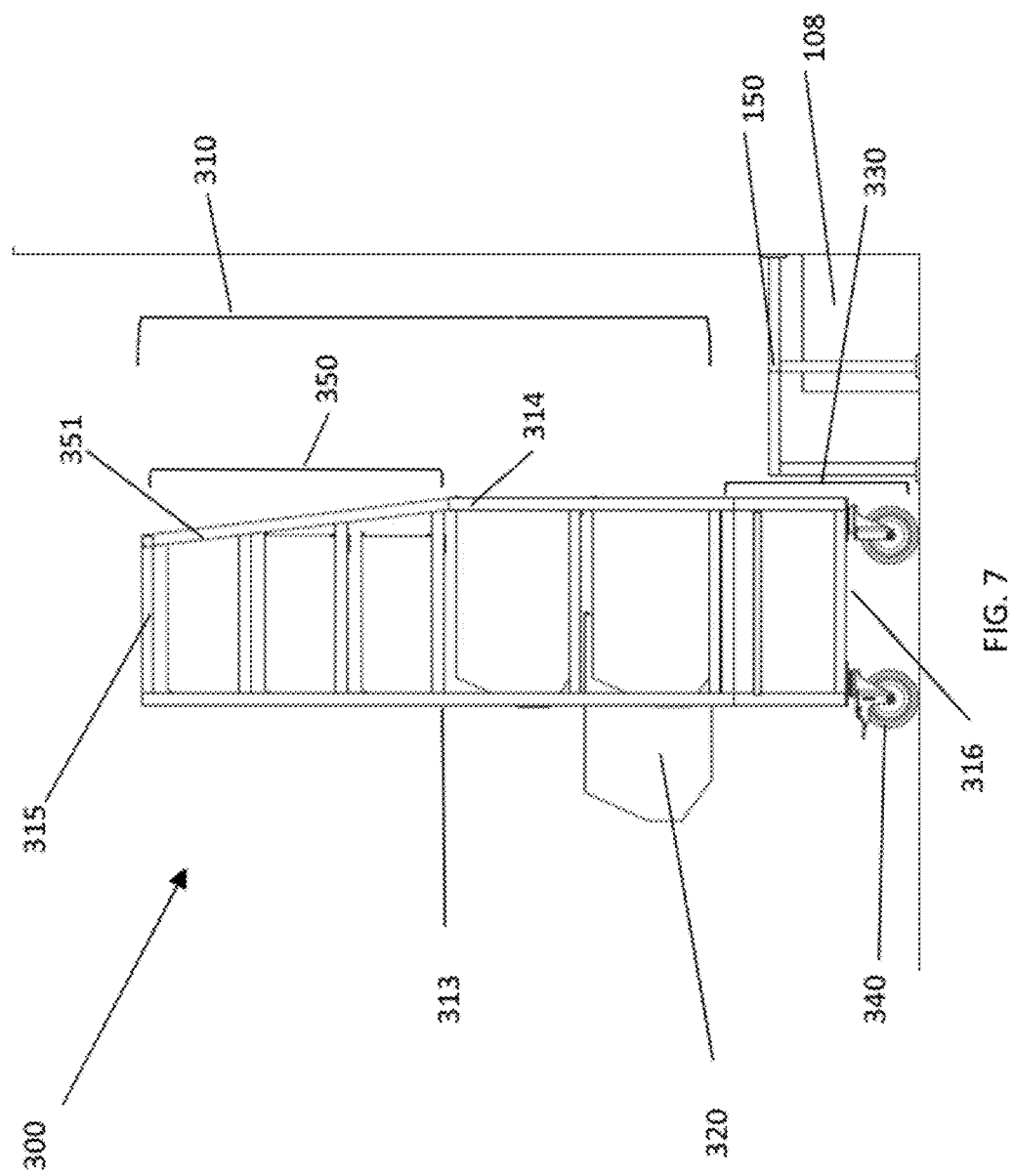
FIG. 7 is a side view of a storage assembly according to an exemplary embodiment.
Figure 8:
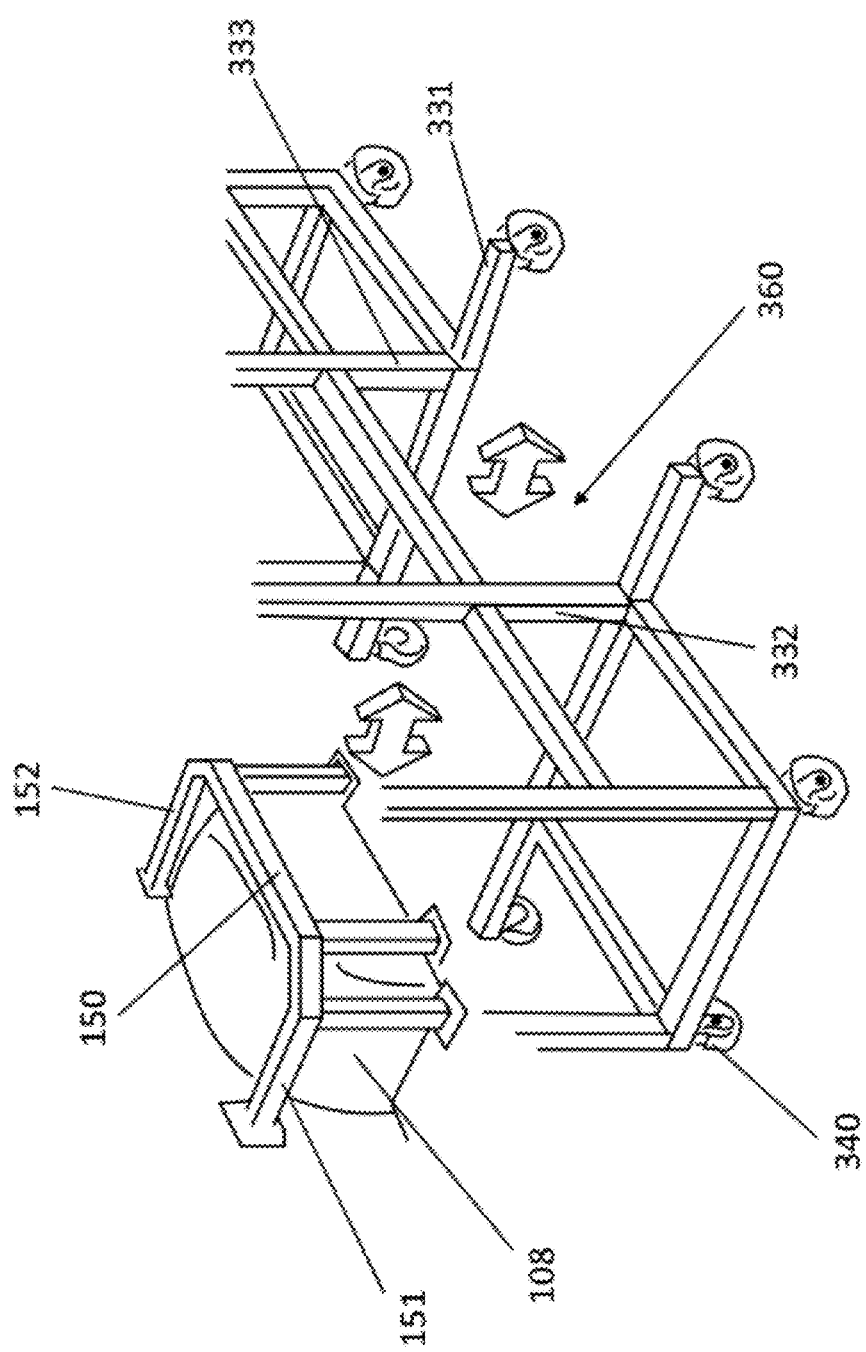
FIG. 8 is an elevated view of a base according to an exemplary embodiment.

Storage cabinet 310 has side 311, side 312, front 313, back 314, top 315, and bottom 316 which define an internal storage space. In one embodiment, the side 311, side 312, front 313, back 314, top 315, bottom 316, or any combination thereof is open, as shown in FIG. 6. The internal storage space within the storage cabinet 310 can be subdivided into storage compartments 317 using cabinet dividers 318. The storage compartments 317 can be any size depending on the desired dimensions of the storage containers 320. The storage compartments 317 can be any number depending on the desired height of the storage assembly 300. For example, the storage cabinet 310 can have five horizontal cabinet dividers 318 creating storage compartments 317 with varying widths and heights. The cabinet dividers 318 can have a slide and lock mechanism that allow for the cabinet dividers 318 to be repositioned, thereby altering the dimension of the storage compartment 317. The storage compartment 317 can receive storage containers 320 of complimentary dimensions. In one embodiment, the storage container 320 has container dividers which further subdivide the space within the storage container 320. The open front 313 of the storage cabinet 310 allows for access to the storage compartment 317 and storage container 320. While each storage cabinet 310 is illustrated with an open front 313, it is understood that other types of storage cabinets 310, for example, without limitation, storage cabinets 310 with doors, are contemplated.

The storage compartment 317 can receive a storage container 320 that holds product. While the product can be any type of product that is transported from one location to another, the product is preferably food. The dimensions of the storage compartment 317 are substantially similar to the dimensions of the corresponding storage container 320, thereby allowing the storage container 320 to slide in and out of the storage compartment 317. The storage container 320 slides in a direction transverse to the longitudinal axis of the storage cabinet 310. The top of the storage container 320 is open allowing for the operator to easily access the stored product when the storage container 320 is removed from storage compartment 317 or completely received by the storage compartment 317.

The bottom of the storage cabinet 310 is mounted to the base 330. A plurality of casters 340 including spaced apart front casters 340 and spaced apart rear casters 340 are mounted to the base 330 of the storage assembly 300 allowing for movement of the storage assembly 300 over a supporting surface 106. The casters 340 may either be mounted for rotation about an axis perpendicular to the horizontal plane of the base 330 or fixed for improved directional stability. In one embodiment, the casters 340 allow one operator to operate and manage the storage assembly 300 during transit of the storage assembly 300. In one embodiment, the base 330 has outriggers 331 extending laterally away from the storage assembly 300 that allow for extra stability during transit.

In one embodiment, the storage assembly 300 has an upper storage portion 350 having a tapered back 351, where the tapered back 351 of the upper storage portion 350 is tapered toward the front 313 of the upper storage portion 350 so that the horizontal cross sectional area at the base 330 of the upper storage portion 350 is greater than the horizontal cross-sectional area at the top of the upper storage portion 350. The tapered back 351 of the upper storage portion 350 allows the storage assembly 300 to be stored in the cooling area 130 so that the back 314 and/or tapered back 351 of the storage assembly 300 is substantially flush with either sidewall 102 or sidewall 103 of the cooling area 130. For example, without limitation, where the wall of the vehicle 100 angles 11 degrees toward the interior of the transportation vehicle 100 at a height of 3' above the supporting surface 106 in the vehicle 100, the tapered back 351 angles 11 degrees from the axis substantially normal to the horizontal plane of the base 330 toward the front 313 of the storage assembly 300 at a storage assembly 300 height of 3' from the supporting surface 106.

In one embodiment, the storage assembly 300 has a cavity 360 for receiving the wheel well thereby allowing for the storage assembly 300 to be stored over the wheel well 108 of the vehicle 100. The height of the cavity 360 is slightly greater than the height of the wheel well 108, thereby allowing the storage assembly 300 to clear the height of the wheel well 108 and straddle the wheel well 108 in a resting position. By the storage assembly 300 clearing the wheel well 108, the storage assembly 300 can be stored against either sidewall 102 or sidewall 103 of the cooling area 130, thereby more efficiently utilizing the space of the cooling area 130.

In the preferred embodiment, the cooling area 130 accommodates two storage assemblies 300 where a first storage assembly 300 is positioned against a sidewall 102 of the cooling area 130 and a second storage assembly 300 is positioned against a sidewall 103 of the cooling area 130.

The design and components of the storage assembly 300 described herein allow for chilled product to be transferred from a first temperature controlled environment to a second temperature controlled environment in a safe and expeditious manner. In one embodiment, the first temperature controlled environment is a warehouse cooling area and the second temperature controlled environment is a cooling area 130. The ability of the storage assembly 300 to transport the chilled food from the first temperature controlled environment directly into the second temperature controlled environment prevents the food from being exposed to long periods of ambient temperatures, thereby minimizing the risks of bacteria growth which could result in food borne illness. Safety to the customer is increased by designing a system which minimizes exposure of chilled product to temperatures higher than the food safe zone. The ability of the storage assembly 300 to transfer a large quantity of chilled food from a first temperature controlled environment to a second temperature controlled environment reduces the number of trips and therefore time required to load the chilled food into the cooling area 130. The decreased risk of bacteria growth and faster loading time of temperature sensitive product increases productivity allowing for the vehicle 100 to operate in a more cost effective manner.

In one embodiment, the vehicle 100 has a restraining device 150 for preventing the storage assembly 300 from moving during transit of the vehicle 100. While the restraining device 150 can be any mechanism that prevents forward or backward movement of the storage assembly 300, the restraining device 150 is preferably a metal frame encompassed with insulation that surrounds the wheel well 108. In this embodiment, where the cavity 360 of the storage assembly 300 receives the restraining device 150, the surface of frame member 151 exterior to the wheel well 108, is substantially flush with the interior surface of support member 332, that is the surface facing the cavity 360, and the surface of frame member 152 exterior to the wheel well 108, is substantially flush with the interior surface of support member 333, that is the surface facing the cavity 360. The design of the restraining device 150 enables an operator to quickly position the storage assembly 300 against sidewall 102 or sidewall 103, thereby restraining the storage assembly 300 from moving in the forward or backward direction.

In one embodiment, the vehicle 100 has a securing device for securing the storage assembly 300 to a sidewall thereby preventing the storage assembly 300 from moving during transit of the vehicle 100. While the securing device can be any mechanism that prevents lateral movement of the storage assembly 300, the securing device is preferably at least one strap. In one embodiment, a first end of the strap engages a sidewall, the strap wraps around the storage container, and the second end of the strap engages a sidewall thereby securing the storage assembly 300 to the sidewall.

In one embodiment, the vehicle 100 has a lift mechanism 400 for transferring a storage assembly 300 from a first height to a second height. The lift mechanism can be an means for transferring a storage assembly from a first height to a second height, for example, without limitation, a life gate, a ramp, or the like. The first height can be greater than the second height and the second height can be greater than the first height. For example, without limitation, as shown in FIG. 1, the lift mechanism 400 allows for a storage assembly 300 to be rolled into the vehicle 100 from ground elevation to the support surface of the vehicle 106 and the height of the support surface of the vehicle 106 is higher than the height of the ground. In another example, without limitation, the storage assembly 300 is rolled into the vehicle 100 from an elevated loading dock which is higher than the support surface of the vehicle 106. The lift mechanism 400 can be engaged to the vehicle or separate from the vehicle and stored in a warehouse where the product is stored.

The vehicle 100 is preferably used in the following manner. The vehicle 100 is parked overnight where the high ampere converter charger 172 is connected to available 120 volt alternating current. This source of power charges the auxiliary batteries. Subsequently, during the next selling shift, the vehicle 100 is detached from the 120 volt alternating current and driven to a warehouse where product is stored, parked in position near lift mechanism 400, and readied for loading. The rear doors 105 are opened and the engine of the vehicle 100 is left running to mechanically power the auxiliary batteries to prevent them from discharging prematurely. While the vehicle 100 is positioned to be loaded, a storage assembly 300 is rolled into the warehouse cooling area. Product is taken from a stored location in the warehouse and placed into storage containers 320 inside the storage assembly 300. Two of the casters 340 are locked in the forward direction and the first storage assembly 300 is wheeled to the vehicle 100. From ground level, the first storage assembly 300 is wheeled up lift mechanism 400 and into cooling area 130. Once the entire length of the first storage assembly 300 has been received by the cooling area 130, the locked casters 340 are unlocked to allow for rotation, and the storage assembly 300 is pushed up against the sidewall 102 in a manner where the cavity 360 receives the restraining device 150, thereby allowing the back 314 and tapered back 351 of the first storage assembly 300 to rest flush with sidewall 102, and preventing the storage assembly 300 from moving in the forward and backward direction. The storage containers 320 of a second storage assembly 300 are stocked with product, rolled into the cooling area 130, and secured into place against the sidewall 103 in the same manner as the first storage assembly 300. The operator exits the vehicle 100, closes the rear doors 105, enters the driving area 110, and drives the vehicle 100 to the desired selling area. At the desired selling area, the engine of the vehicle 100 is turned off. Power is provided to the electrical components by the auxiliary batteries and a combination of solar array 174 and maximum power point tracker controller 173.

At the desired location, the service window 121 is opened and the retractable table 161 and retractable panel 162 are folded out. The operator receives an order from a customer and enters it into the point of sale terminal. The operator enters the cooling area 130 and obtains the desired product from the storage container 320, returns to the retail area 120, packages the product at the preparation counter 122 by placing the ordered units into bags, hands the bags to the customer through the service window 121, and receives payment. The order is transmitted via vehicle server 129 to a host server at a host server located offsite where it is recorded. During this process, the video camera 128 records all activity in the retail area 120.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

Modifications and variations of the present invention are possible in light of the above teachings. It is therefore to be understood that the invention may be practiced otherwise than as specifically described herein.

What is claimed is:

1. A vehicle for vending refrigerated product comprising:
    a chassis supported by wheels,
    a supporting surface supported by the chassis,
    a peripheral body extending vertically from the supporting surface, comprising a first sidewall, a second sidewall, a rear wall, and a top side, said peripheral body comprising a driver area, retail area, and cooling area,
    a bulk head for dividing the retail area from the cooling area and reducing the rate of heat transfer between the retail area and the cooling area, and
    a storage assembly capable of transferring product from an exterior area to the cooling area,
    wherein the storage assembly is placed substantially flush against an angled sidewall of the peripheral body, the storage assembly comprising:
    an open front allowing individually packaged product to be picked by an operator, a plurality of storage containers capable of separating like kinds of product,
    a base, and
    a caster that engages the base and provides for the storage assembly to roll, wherein the vehicle allows for the sale of product from the vehicle at a plurality of locations.

2. The vehicle of claim 1 wherein said retail area comprises a retractable panel providing for a service window where said retractable panel is in the open position, said service window allowing the operator to pass product from the retail area to the exterior of the vehicle.

3. The vehicle of claim 1 wherein said retail area comprises an order preparation counter.

4. The vehicle of claim 1 wherein said retail area comprises a vehicle point of sale system comprising a computer station, a printer, a video camera, and a router.

5. The vehicle of claim 4 wherein said point of sale system further comprises a vehicle server and a point of sale terminal, wherein said vehicle server transmits data to a host server.

6. The vehicle of claim 1 wherein said cooling area comprises a liner for reducing the time and energy required to maintain the temperature within a desired temperature range.

7. The vehicle of claim 1 wherein said cooling area comprises a thermal break for reducing the rate of heat transfer between the cooling area and the retail area by way of the supporting surface.

8. The vehicle of claim 1 wherein said rear wall comprises an insulated rear door that opens providing for a doorway providing the product to pass through the rear wall into the cooling area.

9. The vehicle of claim 1 wherein said bulk head comprises an insulated bulk head door providing for product to pass through the bulk head and reducing the rate of heat transfer between the retail area and the cooling area.

10. The vehicle of claim 1 wherein said storage assembly further comprises an upper storage portion comprising a tapered back, said tapered back providing for the storage assembly to be stored substantially flush to a sidewall of the cooling area.

11. The vehicle of claim 1 further comprising a wheel well and a restraining device wherein said storage assembly further comprises a cavity, said restraining device prevents the storage assembly from moving forward or backward during transit of the vehicle.

12. The vehicle of claim 1 further comprising a securing device for securing the storage assembly to a sidewall for preventing the storage assembly from moving laterally during transit of the vehicle.

13. The vehicle of claim 1 further comprising a lift mechanism for transferring a storage assembly from a first height to a second height.

14. The vehicle of claim 1 further comprising a curtain for reducing the rate of heat transfer between the retail area and the cooling area.

15. The vehicle of claim 1 further comprising a temperature monitoring system comprising a temperature sensor and monitoring software, said monitoring software configured to interact with the temperature sensor and alert an operator when the temperature of the cooling area falls outside of a desired temperature range.

16. The vehicle of claim 1 further comprising an auxiliary power system for powering at least one electrical component, comprising a battery bank and a charging mechanism, said charging mechanism comprising a vehicle charging system, shore power charging system, and solar array charging system, said charging mechanism imparting electrical charge to the battery bank, where said electrical component is a temperature control system for maintaining the temperature of the cooling area within a desired temperature range, said temperature control system comprising an evaporator, condenser, compressor and thermostat.

17. The vehicle of claim 16 wherein said temperature control system comprises a condensate tank to collect condensate generated by the temperature control system.

18. The vehicle of claim 15 wherein said evaporator engages a sidewall and is positioned above a storage assembly, said position of the evaporator allowing an operator to travel through the aisle uninhibited by the evaporator.

19. The vehicle of claim 16 wherein said solar array charging system comprises a solar array, said solar array engaging the exterior of the peripheral body and providing for a radiant barrier for reducing the solar radiation and resultant heat imparted on the peripheral body.

\* \* \* \* \*